Oct. 16, 1962     O. W. GREENWOOD     3,058,358
DIRECTIONAL GYROSCOPE ASSEMBLY FOR AUTOMATIC PILOTS
Filed April 14, 1958     3 Sheets-Sheet 1

INVENTOR.
Orville W. Greenwood
BY John C. McGrgan
James A. Eisenman
ATTORNEYS

Oct. 16, 1962 O. W. GREENWOOD 3,058,358
DIRECTIONAL GYROSCOPE ASSEMBLY FOR AUTOMATIC PILOTS
Filed April 14, 1958 3 Sheets-Sheet 3

INVENTOR.
ORVILLE W. GREENWOOD

BY
ATTORNEYS

United States Patent Office 3,058,358
Patented Oct. 16, 1962

3,058,358
DIRECTIONAL GYROSCOPE ASSEMBLY FOR AUTOMATIC PILOTS
Orville Wallim Greenwood, Springfield, Pa., assignor to Aircraft Products Co., Bridgeport, Pa., a corporation of Pennsylvania
Filed Apr. 14, 1958, Ser. No. 728,157
9 Claims. (Cl. 74—5.6)

This invention relates to automatic pilots for dirigible crafts and more particularly to the directional gyroscope component thereof whereby information regarding the heading of the craft is furnished both for display to the pilot and control of the craft.

Directional gyroscopes, which are normally used to indicate the exact heading or change of heading of aircraft, are adapted for use in automatic pilots by the inclusion of suitable pick-offs for furnishing signals to control the direction of flight of the aircraft, usually through a servo power loop. In directional gyroscopes, the heading is normally indicated by a cylindrical reference card similar to a compass card and displayed through a viewing window in the side of the housing of the instrument. When a directional gyroscope is incorporated in an automatic pilot, a second heading card is added for display above the regular or actual heading card for purposes of heading control. The heading control card is movable with the frame of the instrument, whereas the actual heading card moves with the outer gimbal of the gyroscope.

The several additional components which must be added to a conventional directional gyroscope to enable it to be used in an automatic pilot normally increase the bulk of the instrument. This often makes it impractical or costly to install an automatic pilot in a plane previously furnished with a conventional directional gyroscope because extra space must be found in the normally crowded instrument panel area.

Accordingly, it is one object of the present invention to provide an automatic pilot in which the controls are of minimum weight and require minimum space.

Another object of the invention is to provide, in an automatic pilot, a directional gyroscope having signal pick-off means and heading card means which occupy minimum head space.

In accordance with the present invention, the directional gyroscope unit which both indicates and controls the heading of the aircraft is furnished with a pair of cylindrical cards, one to display the actual heading of the aircraft, and the other to display the desired heading. Pick-off means, such as a pneumatic valve assembly, are incorporated in the upper support bearing of the gimbals, with one part of the pick-off being movable with the gyroscope gimbal, and the other with the housing of the instrument. The part which is movable with the housing is also capable of angular adjusting movement within the housing for purposes of varying the heading control. The heading card is affixed to the latter part of the valve assembly to move therewith. To introduce heading command settings into the instrument, there is provided a control shaft terminating at its outer end in a knob at the face of the instrument and terminating at its inner end in a drive coupling to the surface of the heading control card which is in turn coupled to the pick-off system.

The above and other features and objects of the invention will be apparent from the following description of a preferred embodiment thereof having reference to the accompanying drawings, in which.

Figure 1:
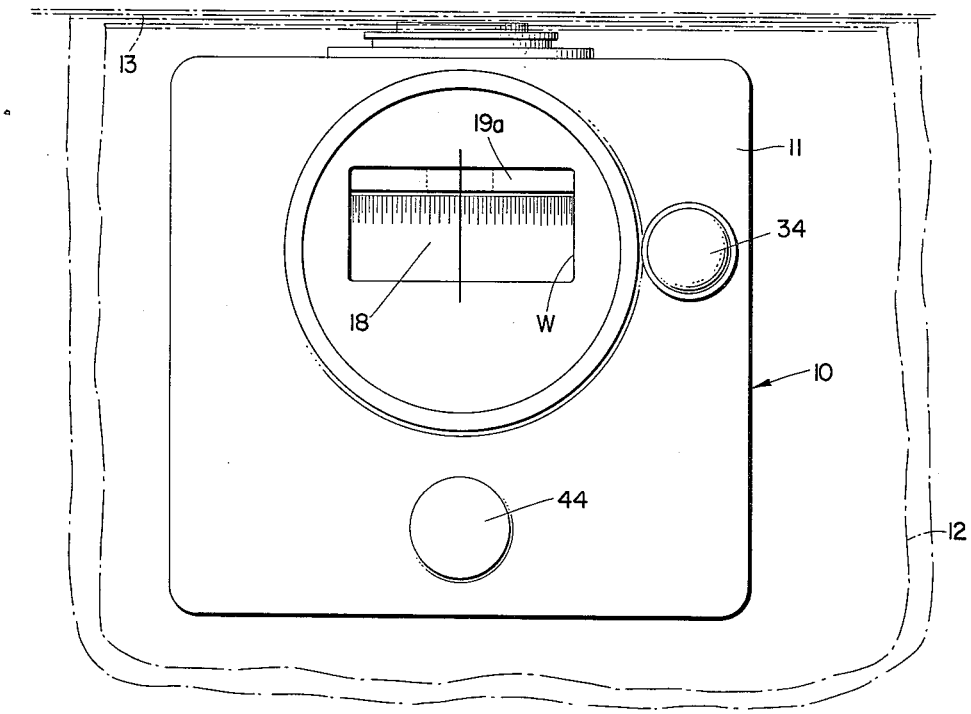
FIGURE 1 is a front view of the directional gyroscope component of an automatic pilot, with one typical mounting thereof relative to the instrument panel of an airplane being shown in phantom lines.

Referring to the drawing, the invention is illustrated as embodied in an automatic pilot system, of which only the directional gyroscope component 10 is shown. The directional gyroscope 10 includes an outer housing 11 attached to the instrument panel 12 of an aircraft immediately beneath the foredeck 13, which terminates in the windscreen (not shown). Within the housing 11 there is mounted, in vertically aligned bearings 14 and 15, a gimbal assembly indicated generally by the numeral 16, only the outer casing portion 17 of which is illustrated. The gimbal assembly 16 in accordance with conventional practice affords freedom of movement of the horizontal-axis-gyroscope in three axes, two horizontal and one vertical. The motion about the horizontal axes is ignored while that about the vertical axis is used as a reference and is detected for purposes to be described.

Affixed to the outer surface of the casing 17 is a cylindrical heading indicating card 18 which is visible through a viewing window W in the front face of the housing 11 (FIGURE 1). Thus, the card 18 turns with the casing 17 to indicate relative angular displacement between the casing and the housing 11, which moves with the aircraft. Surmounting the card 18 is a heading control card 19 having a generally cylindrical indicating portion 19a, concentric with the card 18 and a convergent upper portion 19b secured to a pick-off assembly indicated generally by the numeral 20 incorporated in the bearing 15.

Figure 3:
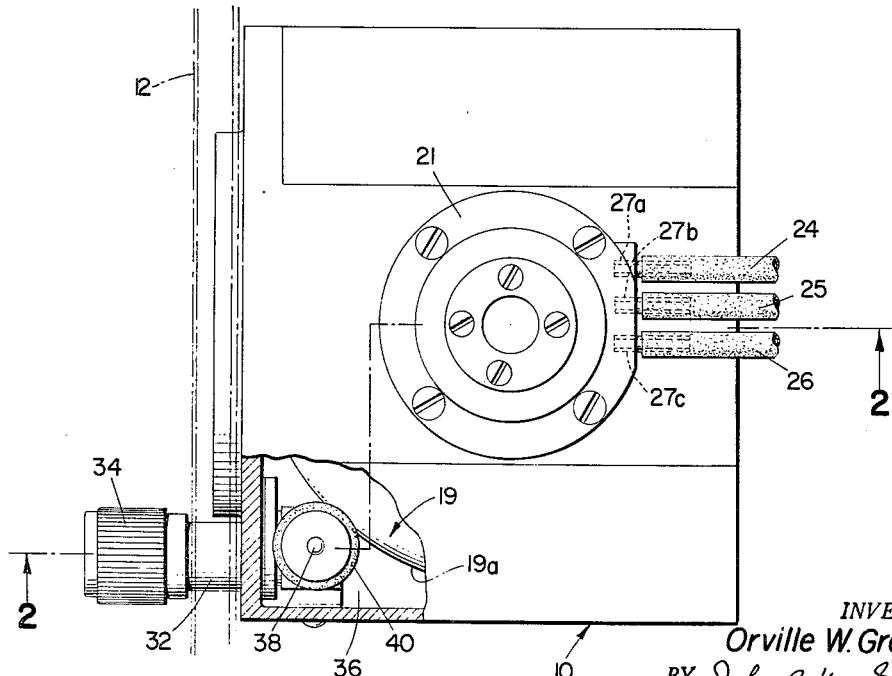
FIGURE 3 is a top view, partially broken away in horizontal section, of the directional gyroscope component of FIGURES 1 and 2.
Figure 2:
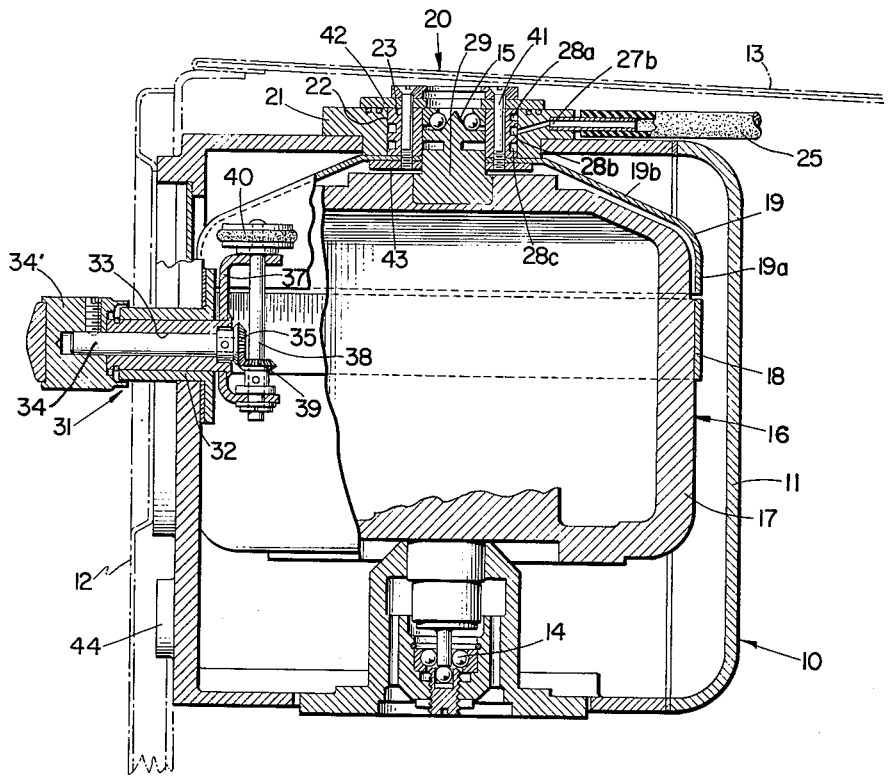
FIGURE 2 is a view in vertical section looking in the direction of the arrows on the staggered line 2—2 of FIGURE 3.

The pick-off assembly 20, which takes the form of a pneumatic valve in the illustrated arrangement, includes a fixed annular portion 21 which is secured to the housing 11 and within the cylindrical central opening 22 of which is mounted a stator sleeve 23. A series of three pneumatic conduits 24, 25, and 26 are connected to radial ducts 27a, 27b and 27c (FIGURE 3) in the annular portion 21, the ducts terminating respectively in circumferential grooves 28a, 28b and 28c (FIGURE 2) in the sleeve 23. The circumferential grooves 28a, 28b and 28c in the outer surface of the sleeve are connected by circumferentially-spaced, radial ducts (not shown) to the inner surface and the cylindrical space defined thereby. A valve rotor 29, fixed to the gimbal casing 17, on the vertical turning axis thereof, and also comprising a trunnion received in the bearing 15, is received within the stator sleeve 23. The rotor 29, moving relative to the radial ducts in the stator sleeve 23, establishes the pneumatic valving action of the system. The conduit 25 is connected to a source of vacuum, and the conduits 24 and 26 are connected to a pneumatic command control unit of the automatic pilot and the pneumatic amplifier, the latter being described in its entirety in the copending application Serial No. 728,158, filed April 14, 1958.

The operation of the pick-off 20 is such that as the outer casing 17 of the gimbal assembly 16 rotates within the housing 11, in response to changing direction of the aircraft, the vacuum of the conduit 25 is directed to one or the other or both of the conduits 24 and 26 to effect the control action forming no part of the present invention and not described, therefore, in detail herein. Assuming the aircraft is flying in a straight line and the conduits 24 and 26 are isolated from the source of vacuum of the conduit 25 by the valve rotor 29, a command change in the heading of the aircraft is effected by turning the stator sleeve 23 within the fixed annular portion 21.

This action, which results in the introduction of vacuum power to one or the other of the conduits 24 or 26 in the same manner as if the gimbal assembly had turned in response to a transient error turn of the aircraft, is brought about in accordance with the present invention by a control system now to be described.

Figure 4:
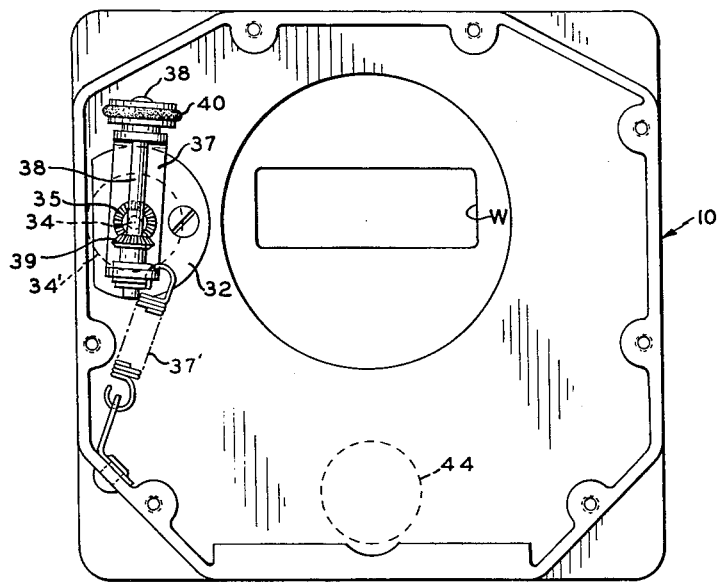
FIGURE 4 is a view in rear elevation of the inside of the housing with the gimbal removed.

Mounted on the front face of the housing 11 and extending outwardly therefrom through the instrument panel 12 of the aircraft is a knob assembly 31 including an outer mounting sleeve 32 secured to the housing 11 and within which is rotatably mounted an inner sleeve 33 which in turn receives, for rotation, a drive shaft 34 having a knob 34' affixed to its outer end and a bevel gear 35 affixed to its inner end. The gear 35 is disposed within the housing 11 in a corner portion 36 thereof (FIGURE 3) defined by the rectangular walls of the housing and the cylindrical surface of the casing 17 and card 19. A bracket 37, fixed on the inner sleeve 33 to rotate therewith, carries a vertical shaft 38, the lower end of which has affixed thereto a bevel gear 39 meshing with the bevel gear 35 and carrying on its upper end a friction drive wheel 40 which engages the cylindrical surface 19a of the card 19. A tension spring 37' is connected between the housing 11 and the bracket 37 to resiliently bias the bracket in a clockwise direction, as viewed in FIGURE 4, to urge the friction wheel 40 against the card 19. In this fashion the wheel 40 remains in driving engagement with the card regardless of possible irregularities in the cylindrical surface 19a, and turning the turn command control knob 34' causes the card 19 to rotate.

The card 19 is secured by its upper portion 19b to the stator sleeve to turn therewith. In the illustrated embodiment of the invention, the card is secured to the sleeve 23 by means of screws 41 joining upper and lower retainer rings 42 and 43 which embrace the sleeve 23, the inner edges of the card 19 being positively clamped between the sleeve and the lower retainer ring 43 preferably across a thin washer (not shown). It will be understood, therefore, that the pick-off assembly 20 is actuated by relative rotation between its several parts, making use of the indicator card as a positive driving link in the linkage between the control knob 34' and the sleeve 23 for command turns.

In the normal course of operation of the automatic pilot, the pilot of the aircraft first sets the lower heading indicating card 18 in accordance with conventional practice to conform to a compass setting by means of a control knob 44 on the face of the instrument. The knob 44 causes the gyroscope, including the casing 17, to turn about the vertical axis of the bearings 14 and 15 to match the setting of the card 18 with a reference setting of, for example, the standard compass. The upper card 19 will at this time be in a random setting with respect to the lower card 18. The directional gyroscope can at this stage be used in the conventional manner to afford exact heading indications. In the event it is desired that the automatic pilot be operated to achieve any desired heading setting, the knob 34' is turned to drive the card 19 to the desired reading. The coupling from the conduits 24 and 26 to the automatic pilot controls is then made through valve means (not shown). This introduces error signals causing the aircraft to turn to the desired heading and to hold the heading automatically thereafter. This heading setting is "memorized" within the unit so that, in the event manual control of the aircraft is for any reason introduced by overriding the automatic pilot, the original heading will again be attained by the aircraft at the time the manual controls are released, this occurring automatically.

While the invention has been described having specific reference to one preferred embodiment thereof, it will be understood that it can take various other forms and arrangements. The invention should not, therefore be regarded as limited except as defined in the following claims.

I claim:

1. In a gyroscope instrument for dirigible vehicles, a housing, a gyroscope assembly within the housing including gimbal means to support the gyroscope for rotation about an axis, said gimbal means having upper and lower trunnions, upper and lower bearing means to support the gimbal means by its trunnions in the housing for rotation about an axis normal to the axis of the gyroscope whereby a change of angular position of the vehicle causes the housing to turn relatively to said gimbal means, pick-off means including a first element carried by a trunnion and movable with the gimbal means and a second element normally movable with the housing, said second element comprising a sleeve surrounding both the trunnion and its bearing means being angularly adjustably movable relatively to the housing, a first indicator card movable with the gimbal means to display an angular relationship between the gimbal means and the housing, a second indicator card, means to couple the second indicator card to said second pickoff element to move therewith, whereby the second card displays an angular relationship between the second pick-off element and the housing, and control means connected to the second indicator card to turn the card relative to the housing, whereby the second pick-off element is driven by the control means through the agency of said second indicator card.

2. Apparatus as set forth in claim 1, the gimbal means of said gyroscope assembly including a casing said first and second cards being concentric with respect to the axis of said trunnion and bearing means and surrounding said casing, the first element of the pickoff means being disposed on said axis and affixed to the casing, said second card being affixed to said second pick-off element to turn the latter in adjusting movement in response to actuation of said control means.

3. Apparatus as set forth in claim 1, said pick-off means comprising a pneumatic valve, the first element thereof comprising a rotor movable with the gimbal means and the second element comprising a stator having the second card affixed thereto, means to support the stator for rotary adjusting movement of the stator relatively to the housing, and pneumatic duct means in the stator in complementary relationship with the rotor, said bearing means and trunnion being disposed at least partially within the stator.

4. In a directional gyroscope instrument for dirigible vehicles having a housing, a gyroscope rotor and inner and outer gimbal means mounted within the housing to support the rotor on a horizontal axis, upper and lower trunnion means to support the outer gimbal means for rotation about a vertical axis and a circular heading indicator card carried by the outer gimbal means concentrically with said vertical axis to indicate an angular relationship between the housing and the outer gimbal means, the invention comprising pick-off means to afford signals indicative of an angular relationship between the outer gimbal means and the housing, bearing to support the upper trunnion against axial movement, said pickoff means comprising a first element embodied in the upper trunnion, a second pick-off element normally fixed to the housing and complementary to the first element, means to support the second pick-off element for adjusting rotation about said vertical axis, a circular second indicator card secured to the second pickoff element and including a circular portion concentric with respect to the vertical axis and disposed adjacent the first indicator card, and heading adjustment means carried by the housing to hold the second indicator card and the second pick-off element fixed with respect to the housing and to drive the second card in rotary movement about the vertical axis, thereby to drive the second pick-off element.

5. A directional gyroscope instrument as set forth in claim 4, said pick-off means comprising a pneumatic valve, said first pick-off element comprising a valve rotor, said second pick-off element comprising a circular valve stator adjustably rotatably journalled in the housing and concentric with respect to said vertical axis, said second indicator card being secured to and movable with the valve stator, and bearing means for the outer gimbal being interposed between the valve rotor and the housing.

6. A directional gyroscope instrument as set forth in claim 5, said heading control means comprising a rotatable control member carried by the housing, a drive member engaging the second indicator card, and operative driving connections between said control member and said driving member, whereby the second indicator card is normally constrained against rotation relatively to said housing and whereby the valve stator can be adjustably rotated to introduce a desired heading setting into the pneumatic valve by changing the angular position of the valve stator relatively to the housing and the valve rotor, and a third sleeve element surrounding the second element and including pneumatic ducts to receive the pneumatic signals from the pneumatic valve, said second pickoff element including circumferential channels in its exterior surface opposing the third element, said pneumatic signals thereby being transferable between the second and third elements while affording relative rotational adjusting movement between the second and third elements.

7. A directional gyroscope instrument as set forth in claim 4, including a drive member connected to said second indicator card a movable support for said drive member, and resilient means to urge the support and drive member toward said second indicator card.

8. A directional gyroscope instrument as set forth in claim 7, said support comprising a bracket mounted in the housing for pivotal movement about an axis, said drive member being rotatably supported by the bracket spaced from said axis, and a control member including a first drive shaft coaxially disposed with respect to said axis.

9. A directional gyroscope instrument as set forth in claim 8, including a second drive shaft carrying said drive member and rotatably mounted in the bracket, said second drive shaft being disposed at an angle to the first drive shaft, and gear means coupling the first and second drive shafts.

References Cited in the file of this patent

UNITED STATES PATENTS

| | | |
|---|---|---|
| 2,129,586 | Moller | Sept. 6, 1938 |
| 2,219,964 | Roland et al. | Oct. 29, 1940 |
| 2,334,002 | Heintz et al. | Nov. 9, 1943 |